United States Patent
Knobloch et al.

(10) Patent No.: US 9,534,155 B2
(45) Date of Patent: Jan. 3, 2017

(54) ADHESION PROMOTION TO DIFFICULT SUBSTRATES FOR HOT MELT ADHESIVES

(71) Applicant: HONEYWELL INTERNATIONAL INC., Morristown, NJ (US)

(72) Inventors: Arthur Knobloch, Sparta, NJ (US); Michael Jablon, Ramsey, NJ (US); Scott Hacker, River Edge, NJ (US); Steve Rotz, Randolph, NJ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 14/626,472

(22) Filed: Feb. 19, 2015

(65) Prior Publication Data

US 2015/0337178 A1 Nov. 26, 2015

Related U.S. Application Data

(60) Provisional application No. 61/949,661, filed on Mar. 7, 2014.

(51) Int. Cl.
*C09J 131/04* (2006.01)
*C08K 5/00* (2006.01)
*C09J 123/08* (2006.01)
*C08K 3/00* (2006.01)

(52) U.S. Cl.
CPC ............ *C09J 131/04* (2013.01); *C08K 3/0041* (2013.01); *C08K 5/005* (2013.01); *C09J 123/0853* (2013.01)

(58) Field of Classification Search
CPC .. C09J 131/04; C09J 123/0853; C08K 3/0041; C08K 5/005

USPC .......................................... 524/271; 427/207
See application file for complete search history.

(56) References Cited

U.S. PATENT DOCUMENTS

| 5,326,413 A * | 7/1994 | Esemplare .......... B24B 13/0052 156/154 |
| 5,441,999 A | 8/1995 | Jarvis et al. |
| 7,754,812 B2 * | 7/2010 | Song ........................ C09J 11/06 525/100 |
| 8,222,336 B2 | 7/2012 | Eberhardt et al. |

(Continued)

FOREIGN PATENT DOCUMENTS

| CN | 1401721 A | 3/2003 |
| CN | 101818035 A | 9/2010 |

(Continued)

*Primary Examiner* — Kelechi Egwim
(74) *Attorney, Agent, or Firm* — Lorenz & Kopf, LLP (57) ABSTRACT

Hot melt adhesive compositions which have enhanced adhesion to difficult substrates, particularly at refrigerator/freezer temperatures or at elevated temperatures. The inventive compositions require a base polymer comprising an ethylene vinyl acetate-containing polymer; a tackifier; an adhesion promoting additive comprising at least one semi-crystalline polymer having a weight average molecular weight of about 30,000 daltons or less; and optional wax; and an optional antioxidant. It has been found that the adhesion promoting additive of this invention enhances the adhesion properties of a hot melt adhesive composition having ethylene vinyl acetate-containing polymer, particularly at elevated temperatures or at low refrigerator and freezer temperatures where other conventional adhesives have been unsuccessful.

23 Claims, 6 Drawing Sheets

(56) References Cited

U.S. PATENT DOCUMENTS

| | | | |
|---|---|---|---|
| 2004/0045666 A1* | 3/2004 | Gong | C09J 123/0853 156/334 |
| 2008/0132625 A1 | 6/2008 | Niehaus et al. | |
| 2011/0229729 A2 | 9/2011 | Laiho et al. | |
| 2013/0109801 A1 | 5/2013 | Coffey et al. | |
| 2013/0295380 A1* | 11/2013 | Merrill | C09J 123/04 428/348 |
| 2014/0037876 A1 | 2/2014 | Esangbedo et al. | |
| 2014/0272219 A1 | 9/2014 | Cheung et al. | |

FOREIGN PATENT DOCUMENTS

| | | |
|---|---|---|
| CN | 102495441 A | 6/2012 |
| CN | 103214995 A | 7/2013 |
| GB | 1534001 A | 11/1978 |

\* cited by examiner

ADHESION PROMOTION TO DIFFICULT SUBSTRATES FOR HOT MELT ADHESIVES

CROSS REFERENCE TO RELATED APPLICATIONS

The present application claims priority to U.S. Provisional Application Ser. No. 61/949,661, filed Mar. 7, 2014, the contents of which are incorporated herein by reference in its entirety.

FIELD OF THE INVENTION

The present invention relates to hot melt adhesive compositions. More particularly, the invention relates to hot melt adhesives which exhibit improved adhesion to difficult substrates, particularly at very low and/or very high temperatures.

BACKGROUND OF THE INVENTION

Hot-melt adhesives are thermoplastic materials that are typically solid at room temperature and are denoted by the abbreviation "HMA" (hot-melt adhesives). Hot melt adhesives are widely used in industry for various applications such as product assembly, packaging, hygiene and elastic attachment, lamination, case and carton sealing, bookbinding and applications in the construction bonding, furniture, and textile industries, profile wrapping, and the like.

Various HMA's have different weaknesses relating to adhesion to certain substrates and adhesion at different temperatures. For instance, hot melt adhesives based on metallocene ethylene octene copolymers, or "mEO" adhesives, which are advantageous for their low odor, high clarity, and ease of use, often exhibit poor adhesion to difficult substrates (such as those defined herein), particularly at low temperatures such as refrigerator or freezer temperatures. This can be a problem in applications relating to corrugated and/or coated carton stock for food packaging and the like because these applications are often used or stored in a wide-array of temperatures, including the high and low temperatures provided herein. Conversely, hot melt adhesives based on amorphous poly-alpha-olefins, known as "APAO" adhesives, often suffer from poor adhesion to difficult substrates, particularly at elevated temperatures, as well as lack viscosity control while maintaining adhesive and cohesive properties required for performance. This can be a problem with applications such as film laminating, woodworking, profile wrapping, PVC edge banding, and other adhesion applications with wood, steel, and wrapping films.

It is highly undesirable for materials to lose adhesion due to an adhesive that either lacks cold temperature resistance and becomes brittle, or lacks high temperature resistance and softens. However, in achieving high temperature resistance, cold temperature resistance is often sacrificed, and vice versa. In addition, an increase in adhesion may result in a decrease in cohesion between component parts of a composition. It would therefore be desirable to formulate a hot melt adhesive composition having improved cohesion properties in addition to improved adhesion performance to difficult substrates, particularly at elevated and/or low temperatures. Such compositions would exhibit improved adhesion to difficult substrates at elevated and/or low temperatures, as compared to conventional hot melt adhesives. Further, certain compositions would exhibit an increase in both cohesion and adhesion when considering both shear adhesion failure temperature (SAFT) and peel adhesion failure temperature (PAFT).

SUMMARY OF THE INVENTION

The present invention relates, in part, to hot melt adhesive compositions that exhibit improved adhesion to difficult substrates, particularly at low and/or high temperatures.

In certain non-limiting aspects, particularly, though not exclusively, when the hot melt adhesive is used on high temperature substrates or substrates that are exposed to high temperature conditions, as defined herein, the hot melt adhesive composition comprises:
  a) a base polymer comprising an ethylene vinyl acetate-containing polymer;
  b) a tackifier;
  c) an antioxidant;
  d) an adhesion promoting additive comprising at least one semi-crystalline polymer having a weight average molecular weight of about 30,000 daltons or less; and
  e) an optional wax.

The invention also provides a process for forming such a hot melt adhesive composition which comprises combining:
  a) a base polymer comprising an ethylene vinyl acetate-containing polymer;
  b) a tackifier;
  c) an antioxidant;
  d) an adhesion promoting additive comprising at least one semi-crystalline polymer having a weight average molecular weight of about 30,000 daltons or less and
  e) an optional wax.

The invention further provides a process for forming an adhesive substrate which comprises:
I) forming a hot melt adhesive composition by combining
  a) a base polymer comprising an ethylene vinyl acetate-containing polymer;
  b) a tackifier;
  c) an antioxidant;
  d) an adhesion promoting additive comprising at least one semi-crystalline polymer having a weight average molecular weight of about 30,000 daltons or less; and
  e) an optional wax;
II) heating the hot melt adhesive composition to a temperature at or above the melting point of the hot melt adhesive composition; and
III) applying the heated hot melt adhesive composition to a substrate.

In further, or alternative, non-limiting aspects, particularly, though not exclusively, when the hot melt adhesive is used on low temperature substrates or substrates that are exposed to low temperature conditions, as defined herein, the hot melt adhesive composition comprises:
  a) a base polymer comprising an ethylene vinyl acetate-containing polymer;
  b) a tackifier;
  c) an adhesion promoting additive comprising at least one semi-crystalline polymer having a weight average molecular weight of about 30,000 daltons or less wherein the adhesion promoting additive comprises a maleated polymer having a SAP number equal to or greater than 20;
  d) an optional antioxidant; and
  e) an optional wax.

The invention also provides a process for forming such a hot melt adhesive composition which comprises combining:
  a) a base polymer comprising an ethylene vinyl acetate-containing polymer;

b) a tackifier;

c) an adhesion promoting additive comprising at least one semi-crystalline polymer having a weight average molecular weight of about 30,000 daltons or less wherein the adhesion promoting additive comprises a maleated polymer having a SAP number equal to or greater than 20;

d) an optional antioxidant; and e) an optional wax.

The invention further provides a process for forming an adhesive substrate which comprises:

I) forming a hot melt adhesive composition by combining a) a base polymer comprising an ethylene vinyl acetate-containing polymer;

b) a tackifier;

c) an adhesion promoting additive comprising at least one semi-crystalline polymer having a weight average molecular weight of about 30,000 daltons or less wherein the adhesion promoting additive comprises a maleated polymer having a SAP number equal to or greater than 20;

d) an optional antioxidant; and e) an optional wax.

II) heating the hot melt adhesive composition to a temperature at or above the melting point of the hot melt adhesive composition; and III) applying the heated hot melt adhesive composition to a substrate.

Additional embodiments and advantages to the invention will be readily apparent to the skilled artisan on the basis of the disclosure and Examples provided herein.

DETAILED DESCRIPTION OF THE INVENTION

The present invention provides hot melt adhesive compositions which exhibit improved adhesion to difficult substrates, particularly at low and/or high temperatures. Temperatures considered "low" are those temperatures at which foods are refrigerated or frozen. Refrigerator temperatures typically range from about 33° F. (0.56° C.) to about 40° F. (4.4° C.). Freezer temperatures typically range from about 32° C. (0° C.) and below. Particularly low temperatures are those at which frozen foods are stored, for instance about −4° F. (−20° C.). Temperatures considered "high" are those at temperatures above the DOT (Department of Transportation) temperature test requirement for adhesives, which is about 60° C. Temperatures above this, and particularly those at about 65° C. or higher, would be considered "high" for adhesives. The term "difficult substrate" is herein defined as those substrates in which hot melt adhesives, particularly though not exclusively EVA-based hot melt adhesives, typically exhibit poor adhesiveness. Non-limiting examples of difficult substrates at low temperatures include food packaging materials such as plastics (e.g. polyethylenes, polypropylenes, polycarbonates, PET, etc.), certain metals (e.g. aluminum), cross-linked acrylic coatings, and acrylic coated paperboard. Non-limiting, examples of difficult substrates at high temperatures include plastics (e.g. polyethylenes, polypropylenes, polycarbonates, etc.), certain metals (e.g. aluminum), vinyl and wood. This is by no means an exhaustive list, as a tremendous variety of substrates, particularly composite materials, are used in the packaging industry. To this end, the present invention is intended to include any of such materials, particularly materials where adhesion at cold or hot temperatures is required.

The invention provides a hot melt adhesive composition which comprises:

a) a base polymer comprising at least one ethylene vinyl acetate-containing polymer; b) a tackifier; c) an adhesion promoting additive comprising at least one semi-crystalline polymer having a weight average molecular weight of about 30,000 daltons or less; d) an optional wax; and e) an optional antioxidant.

The base polymer is defined herein as being the polymer component of the highest molecular weight in the overall hot melt adhesive composition. The base polymer according to this invention comprises at least one ethylene vinyl acetate-containing polymer. As used herein, the term "polymer" is meant to include homopolymers, copolymers, terpolymers, interpolymers, or combinations thereof. The base polymer component is preferably present in the hot melt adhesive composition in an amount ranging from about 5% by weight to about 95% by weight, in certain preferred embodiments from about 20% by weight to about 80% by weight, in further preferred embodiments from about 30% by weight to about 60% by weight, and in even further preferred embodiments from about 30% by weight to about 50% by weight.

As used herein, an ethylene vinyl acetate-containing monomer includes an ethylene monomer polymerized with a vinyl acetate polymer. The ethylene and vinyl acetate monomers may be provided in any amount, particularly any amount that would render the polymer suitable for use in a hot melt adhesive. In certain non-limiting embodiments, the ethylene monomer is provided in the polymer in an amount ranging from about 5% by weight to about 95% by weight, in certain preferred embodiments from about 10% by weight to about 90% by weight, in further preferred embodiments from about 15% by weight to about 85% by weight, and in even further preferred embodiments from about 50% by weight to about 80% by weight. To this end, and in further embodiments, the vinyl acetate may be provided in the polymer in an amount ranging from about 2% by weight to about 95% by weight, in certain preferred embodiments from about 10% by weight to about 90% by weight, in further preferred embodiments from about 15% by weight to about 85% by weight, and in even further preferred embodiments from about 20% by weight to about 50% by weight. Commercially available ethylene vinyl acetate-containing polymer useful for this invention nonexclusively include EVA 28VA, 200MI marketed under the tradename ELVAX®, EVA 28VA, 400MI marketed under the tradename ELVAX® 210W, EVA 28VA, 800MI, marketed under the tradename ELVAX® 205W available from DuPont.

In certain aspects, the ethylene vinyl acetate-containing polymer preferably has a specific gravity of about 1.0 or below, and more preferably from about 0.98 or below. The specific gravity may be determined using ASTM procedure D1238-04c, "Standard Test Method for Melt Flow Rates of Thermoplastics by Extrusion Plastometer."

In further aspects, the ethylene vinyl acetate-containing polymer preferably has a melt index of from about 5 to about 3000, more preferably from about 200 to about 2000, and most preferably from about 300 to about 1200. In one specific embodiment, a preferred ethylene vinyl acetate-containing polymer has a melt index of about 350 to about 850.

In even further aspects, the ethylene vinyl acetate-containing polymer has a polydispersity of about 4.0 or less, and a density of from about 0.886 g/cm$^3$ to about 0.980 g/cm$^3$. Polydispersity is defined herein as the ratio of the weight-average molecular weight to the number average molecular weight, or Mw/Mn. Polydispersity is an indicator of molecular weight variation. A lower polydispersity corresponds to a narrow molecular weight range, which is indicative of improved performance, especially over a range of temperatures.

It has now been unexpectedly found that EVA adhesive compositions which are formed according to the present invention exhibit improved adhesion to difficult substrates at high temperatures and at low temperatures in the presence of a maleated adhesion promoting additive, and in certain embodiments in the presence of one or more antioxidants. The unexpected findings of improved adhesion, in terms of improved SAFT/PAFT, other adhesive tests, and/or other physical properties, are shown in the Examples below. More specifically, Applicants to the present invention have shown that, in high temperature applications an improvement in physical properties, particularly PAFT and SAFT, are observed using the EVA adhesive compositions, particularly when the composition includes at least one antioxidant and the adhesion promoting additive has a SAP number equal to or greater than 20. The EVA compositions similarly demonstrate improved performance in cold temperature applications, particularly when provided in the presence of an adhesion promoting additive having a SAP number equal to or greater than 20, and in certain aspects equal to or greater than 50. Additional boosts in adhesiveness in cold temperature applications may be found when the composition is provided with at least one antioxidant.

In certain aspects, the present inventive compositions include at least one tackifier. The tackifier gives tack to the adhesive, and may also lower viscosity. Lower viscosity improves application flow characteristics, allowing for easier processing, lower energy requirements, and lower processing temperatures. Lower viscosity also helps the adhesive to "wet out," or to substantially uniformly coat the surface and penetrate the substrate. Tack is required in most adhesive formulations to allow for proper joining of articles prior to solidification of the hot melt adhesive. Any conventionally known tackifier, which is suitable for use in formulating hot melt adhesives, may be used in the present practice of the invention. Examples of suitable tackifiers nonexclusively include glycerol and pentaerythritol esters of natural and chemically modified rosins; naturally occurring and chemically modified resins, such as wood rosin, gum rosin, tall oil rosin, distilled rosin, and rosins modified by processes such as polymerization, hydrogenation, esterification and dimerization; thermal oligomerization and aromatic modification; polyterpene resins; modified terpene resins, such as chlorinated terphenyl resins and phenolic-modified terpene resins; aliphatic petroleum hydrocarbon resins, such as those resulting from polymerization of olefin and diolefin monomers, cyclopentadiene or dicyclopentadiene, piperylene, oligomers of the same, or combinations thereof. A preferred tackifier comprises a modified rosin (such as an ester modified rosin), an aromatic modified cycloaliphatic hydrocarbon resin and/or polyterpene. Commercially available tackifiers which are suitable for this invention nonexclusively include Sylvalite TM RE-100L, available from Arizona Chemical Oy; Escorez® 5637 and Escorez® 2596, available from Exxon Mobil Corporation of Irving, Tex.

The tackifier is preferably present in the inventive hot melt adhesive composition in an amount ranging from about 2% by weight to about 75% by weight, in certain preferred embodiments from about 15% by weight to about 70% by weight, in certain preferred embodiments from about 20% to about 50% by weight, and in certain preferred embodiments from about 25% to about 55% by weight of the overall composition.

The inventive compositions may optionally further comprise, and in certain preferred embodiments comprise, an optional wax and/or antioxidant. Waxes serve to reduce the overall viscosity of the adhesive, thereby allowing it to liquefy and allowing for the proper application or coating of the hot melt adhesive onto an intended substrate. The type and melting point of a wax controls the open time and setting speed of the adhesive. Open time is known in the art as being the amount of time for an adhesive to wet out and bond to a substrate after application. Any conventionally known wax, which is suitable for use in formulating hot melt adhesives, may be used in the practice of the invention. Examples of suitable waxes nonexclusively include polar waxes, paraffin waxes, polyolefin waxes, Fischer-Tropsch waxes, petroleum waxes, synthetic waxes, vegetable waxes, microcrystalline waxes, ethylene vinyl acetate waxes, polyethylene waxes, slack wax, byproduct or degraded waxes derived from polymerization or refinery processes, oxidized waxes, ethylene acrylic acid copolymer waxes, or combinations thereof. One commercially available wax that is suitable for this invention is Sasol® H-I, available from Sasol Wax Americas, Inc. of Shelton, Conn. In certain non-limiting embodiments Fischer-Tropsch waxes are substantially absent from the hot melt adhesive composition.

The wax, when provided, may be in any amount standard in adhesive technologies, or may be provided in any amount to effectively reduce the overall viscosity of the adhesive, thereby allowing it to liquefy and allowing for the proper application or coating of the hot melt adhesive onto an intended substrate. In certain non-limiting embodiments, the present invention includes an wax in an amount of from about 1% to about 50% by weight, in certain preferred embodiments from about 10% to about 40%, and in certain preferred embodiments from about 12% to 33%.

The present invention, in certain embodiments, includes an antioxidant in an amount of from about 0.1% to about 5% by weight, in certain preferred embodiments from about 0.1% to about 3%, and in certain preferred embodiments from about 0.2% to 1%. In certain embodiments, the antioxidant level is at or greater than 0.2% by weight and in further embodiments, it is at or greater than 0.4% by weight. The antioxidant(s) may be any antioxidant that is useful in the hot melt adhesive compositions of the present invention and are incorporated to help protect the polymers noted above, and thereby the total adhesive system, from the effects of thermal and oxidative degradation and/or cross linking which may occur during either manufacture and application of the adhesive as well as in the ordinary exposure of the final product to ambient or, in certain preferred embodiments, high temperature environments. Such degradation is usually manifested by deterioration in the appearance, physical properties and performance characteristics of the adhesive. Among the applicable antioxidants which can be included in the adhesive composition of the present invention are high molecular weight hindered phenols and multifunctional phenols, such as but not limited to sulfur-containing and phosphorous-containing phenols. Hindered phenols, known to those skilled in the art, may be described as phenolic compounds, which also contain sterically bulky radicals in close proximity to the phenolic hydroxyl group. Specifically, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity. It is believed that this hindrance provides the stabilizing properties of these phenolic compounds.

Representative hindered phenols include; but are not limited to: 2,4,6-trialkylated monohydroxy phenols; 1,3,5-trimethyl-2,4,6-tris-(3,5-di-tert-butyl-4-hydroxybenzyl)-benzene; pentaerythritol tetrakis-3(3,5-di-tert-butyl-4-hydroxyphenyl)-propionate, commercially available under the trademark IRGANOX® 1010; n-octadecyl-3(3,5-di-tert-butyl-4-hydroxyphenyl)-propionate commercially available under the trademark IRGANOX® 1076; 4-{[4,6-bis(octylsulfanyl)-1,3,5-triazin-2-yl]amino}-2,6-di-tert-butylphenol commercially available under the trademark IRGANOX® 565; 4,4'-methylenebis (4-methyl-6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; 2-(n-octylthio)ethyl 3,5-di-tert-butyl-4-hydroxy-benzoate; di-n-octadecyl 3,5-di-tert-butyl-4-hydroxy-benzylphosphonate; and sorbitolhexa(3,3,5-di-tert-butyl-4-hydroxy-phenyl)-propionate.

Antioxidants may also include, but are not limited to, butylated hydroxy anisole ("BHA") or butylated hydroxy toluene ("BHT"), phosphites, such as tris(2,4-ditert-butylphenyl)phosphite which is commercially available as IRGAFOS® 168 or any other antioxidant that may also be utilized to render the formulation more thermally stable.

In certain aspects, antioxidants are added to protect the adhesive from degradation caused by reactions with oxygen which are induced by such things as heat, light or residual catalyst from the raw materials. Lowering the temperature of application as in the present invention also helps to reduce degradation. Such antioxidants are commercially available from Ciba-Geigy located in Hawthorn, N.Y. and include IRGANOX® 565, 1010 and 1076 which are hindered phenolic antioxidants. These are primary antioxidants which act as free radical scavengers and may be used alone or in combination with other antioxidants such as phosphite antioxidants like IRGAFOS® 168 available from Ciba-Geigy. Phosphite antioxidants are considered secondary antioxidants, are not generally used alone, and are primarily used as peroxide decomposers. Other available antioxidants are CYANOX® LTDP available from Cytec Industries in Stamford, Conn. and ETHANOX® 1330 available from Albemarle Corp. in Baton Rouge, La. Many other antioxidants are available for use by themselves, or in combination with other such antioxidants.

Another component of the present hot melt adhesive compositions is the adhesion promoting additive. The adhesion promoting additive comprises at least one semi-crystalline polymer having a weight average molecular weight of about 30,000 daltons or less, preferably from about 8,000 daltons to about 25,000 daltons, and more preferably from about 12,000 daltons to about 22,000 daltons. Using semi-crystalline polymers having a weight average molecular weight of about 30,000 daltons or less enhances the adhesion promoting additive's compatibility with the higher molecular weight base polymer. Examples of suitable semi-crystalline polymers for the adhesion promoting additive non-exclusively include: propylene-containing polymers, maleated propylene-containing polymers, maleated ethylene-containing polymers, or combinations thereof. Specific examples include maleated propylene-ethylene copolymer, maleated ethylene copolymers or homopolymers, propylene-ethylene copolymer, propylene copolymers or homopolymers, and maleated propylene copolymers or homopolymers. A preferred semi-crystalline polymer for this invention comprises maleated propylene-ethylene copolymer and/or a maleated propylene homopolymer. Commercially available adhesion promoting additives useful for this invention nonexclusively include certain Honeywell A-C® additives, such as ethylene acrylic acid co-polymers, A-C® polyethylene homopolymers, A-C® polypropylene homopolymers, maleated A-C® polyethylene homopolymers, maleated A-C® polypropylene homopolymer, A-C® oxidized polyethylenes, and A-C® oxidized polypropylenes. Non-limiting examples of which including, but are not limited to, A-C® 925, A-C® 573, A-C® 575, A-C® 577, A-C® 578, A-C® 596, A-C® 597, A-C® 1325, A-C® 1089, A-C® 1660, A-C® 15, A-C® 8, A-C® 6, A-C® 415, and A-C® 1172 additives, which are available from Honeywell International Inc., of Morristown, N.J.

In a preferred embodiment, the adhesion promoting additive comprises a semi-crystalline polymer, as described above, which comprises a maleated polymer having a percent bound of about 50% or greater. The term "percent bound" (i.e. percent grafted) is defined herein as the weight ratio of bound maleic anhydride to the total maleic anhydride of a maleated polymer. The total maleic anhydride includes both bound and unbound maleic anhydride. The term "bound maleic anhydride" is defined as the maleic anhydride which has reacted with the polymer chain, and is thus bound or grafted thereto. The term "unbound maleic anhydride" describes both unreacted maleic anhydride and unbound maleic anhydride-containing oligomers. Maleated polymers having a percent bound of 50% or greater nonexclusively include: A-C® 925, A-C® 1325, A-C® 596, A-C® 597, A-C® 573, A-C® 575, and A-C® 907, available from Honeywell International, Inc. of Morristown, N.J. In certain preferred embodiments, the maleated polymers have a percent bound of maleic anhydride of from about 50 to about 100%, in certain preferred embodiments of from about 60 to about 95%, and in further embodiments of from about 70 to about 90%.

In certain preferred embodiments, the maleated polymers have a SAP number of from about 1 to about 120, in certain preferred aspects of from about 15 to about 90. In certain aspects, the maleated polymers have a SAP number at or greater than about 20, and in certain preferred aspects at or greater than about 50.

In a preferred embodiment, the adhesion promoting additive comprises a semi-crystalline polymer, as described above, which has a Mettler drop point of from about 100° C. to about 170° C. Mettler drop point is determined by a Mettler drop point apparatus, which is well-known in the art. The Mettler drop point is the point where a molten polymeric material "drops" past an electric eye, and is recorded in terms of the temperature of the dropping point, generally in degrees Celsius or Fahrenheit. Mettler drop point of the adhesion promoting additive is a function of its crystallinity, which contributes to the heat resistance, process temperature, and application performance of the final adhesive. In a further embodiment, an ethylene-based adhesion promoting additive has a viscosity, based on Brookfield viscometer measurement at 140° C., of from about 100 cps to about 5000 cps. In another embodiment, an adhesion promoting additive comprising propylene has a viscosity, based on Brookfield viscometer measurement at 190° C., of from about 100 cps to about 5000 cps, due to the melting point of propylene. The viscosity may be determined using ASTM procedure D3236.

The adhesion promoting additive is preferably present in the hot melt adhesive composition in an amount of from about 1% to about 30% by weight of the composition, more preferably from about 1% to about 28% by weight of the composition, and most preferably from about 11% to about 25% by weight of the composition.

It has been unexpectedly found that the adhesion promoting additive of this invention enhances the adhesion properties of a hot melt adhesive composition having an ethylene vinyl acetate-containing polymer at both low and high temperatures where other conventional adhesives have suffered. More specifically, and as demonstrated in the Examples provided, a surprising and unexpected boost in adhesiveness was found when maleated additives were added to compositions containing EVA based polymers. This was especially true as the additives contained increased SAP numbers and/or were provided within one or more antioxidants.

Figure 1:
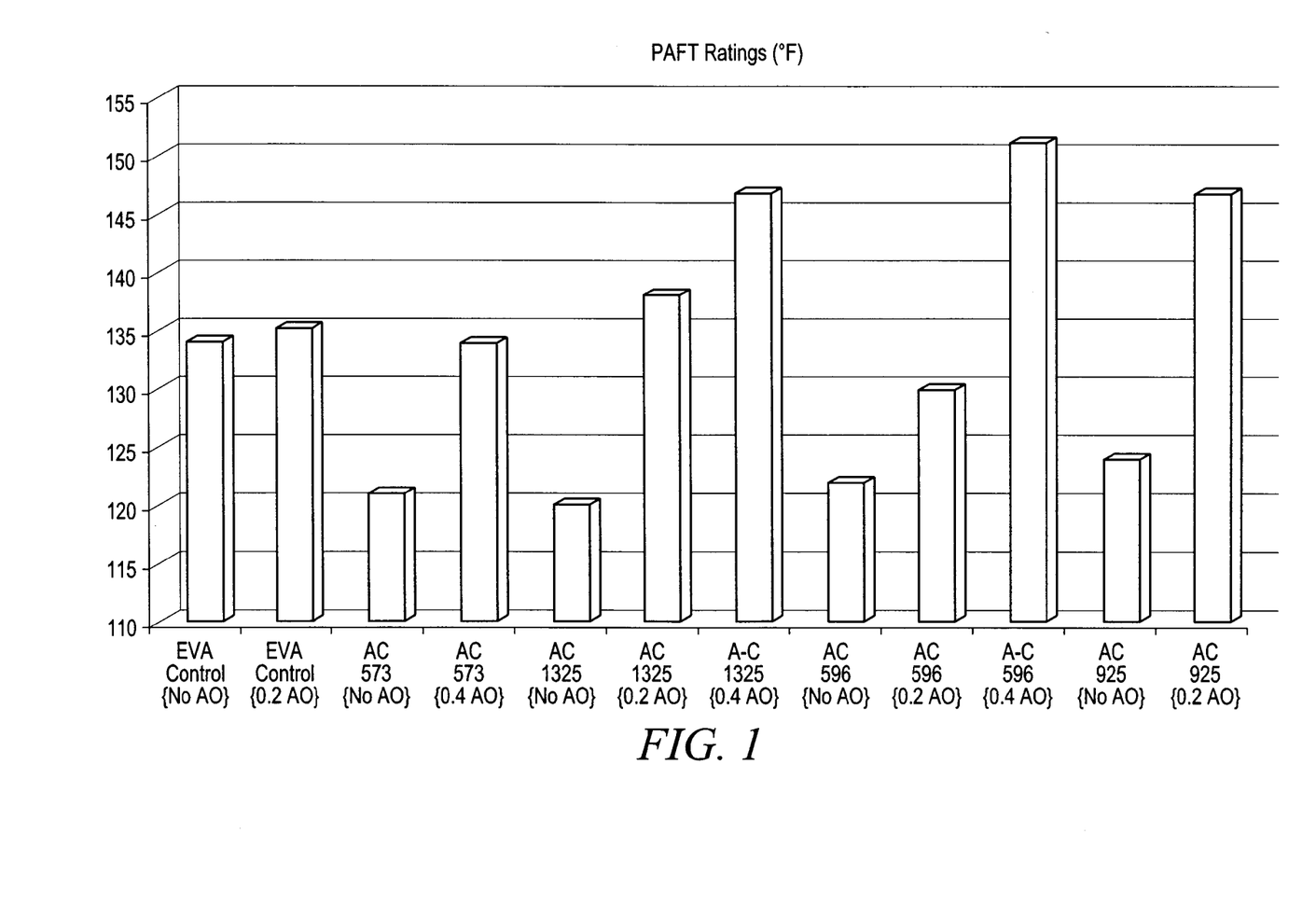
FIG. 1 provides a graphic illustration of the PAFT data obtained in Example 1 and provided in Table B.
Figure 2:
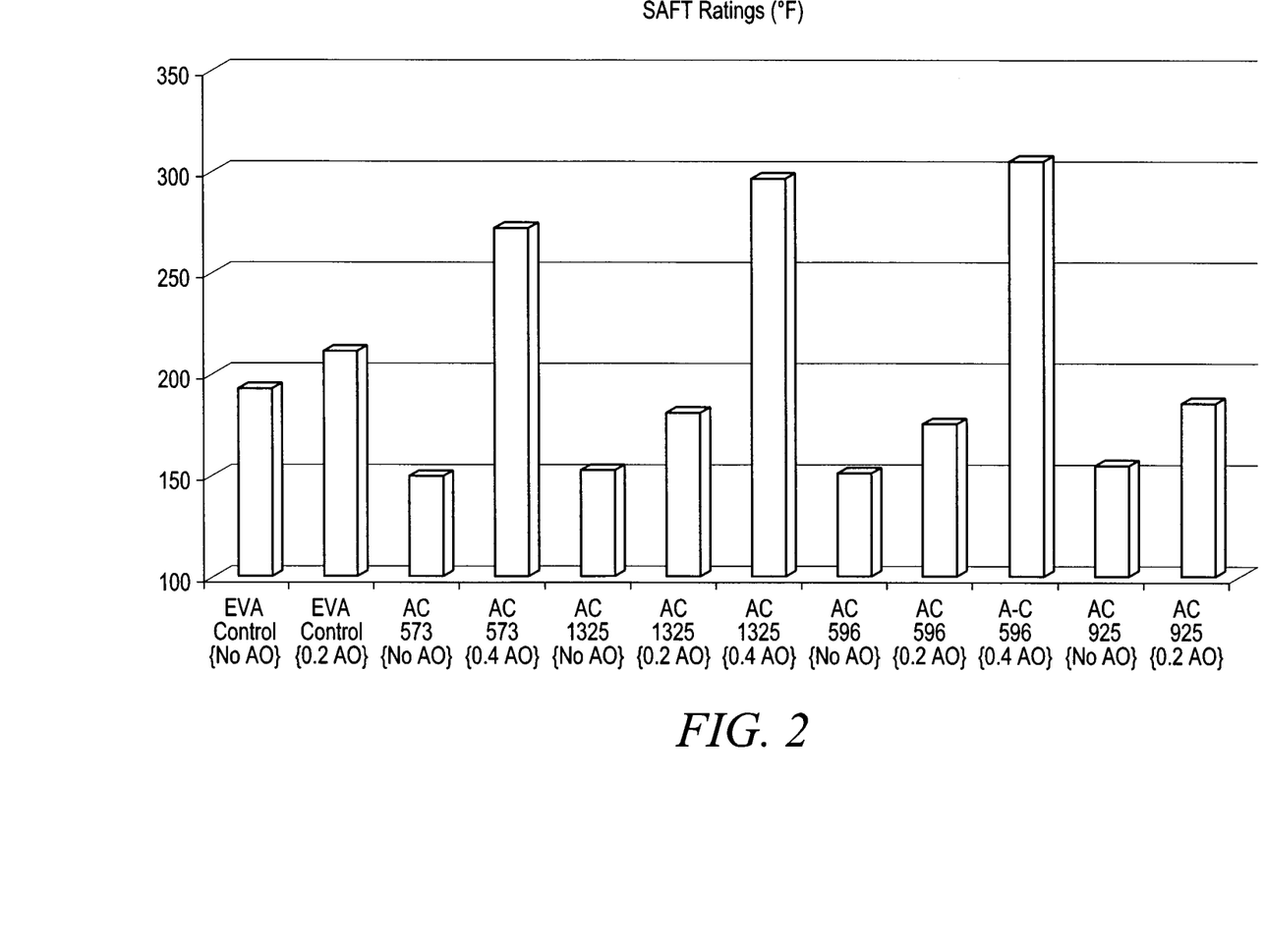
FIG. 2 provides a graphic illustration of the SAFT data obtained in Example 1 and provided in Table B.

Example 1 provides a comparison of PAFT and SAFT results between (1) an EVA-based composition without an adhesion promoting agent; (2) an EVA-based composition with an adhesion promoting agent; and (3) EVA-based compositions with either 0.2% or 0.4% of an antioxidant. As illustrated, EVA-based compositions exhibited a slight drop in SAFT and PAFT values upon the addition of an adhesion promoting agent. Upon, the addition of 0.2% antioxidant, these values increased. They increased even more dramatically upon the addition of 0.4%. Such an increase is entirely unexpected. While not intending to be bound by theory it is surmised that at higher temperatures the polymeric components of the composition undergo cross-linking which weakens adhesive strength and results in gelling and cross-linking. The addition of the antioxidant is thought to reduce the level of this cross linking by minimizing free radical formation. Accordingly, the adhesive strength of the adhesive is improved over a wider temperature range.

Example 2 provides a comparison of lap shear results between (1) an EVA-based composition without an adhesion promoting agent; (2) and EVA- and mEO-based control without and adhesion promoting agent and with an antioxidant; and (3) EVA-based compositions with an adhesion promoting additive and 0.2% an antioxidant. As indicated in the figures provided, EVA controls and EVA/maleated polypropylene (MAPP) blends outperformed standard mEO affinity cold packaging adhesive. Moreover, the performance of the adhesive is correlated with the percent maleation. AC 1325, AC 596 and AC 907 have a SAP number of about 18, 50 and 87, respectively. The higher the SAP number, the more moieties available for adhesion, i.e. the higher the percent maleation. And, as illustrated by the graph, the higher the SAP number (i.e. the higher the maleation) the better the adhesive. While it is noted that EVA AC 1325 had an adhesive performance that was less than the control, it is believed that this performance would be boosted with increased antioxidant levels, as established in Example 1. To this end, a combination of increased maleation and antioxidant results in improved properties in the lap shear testing.

Figure 5:
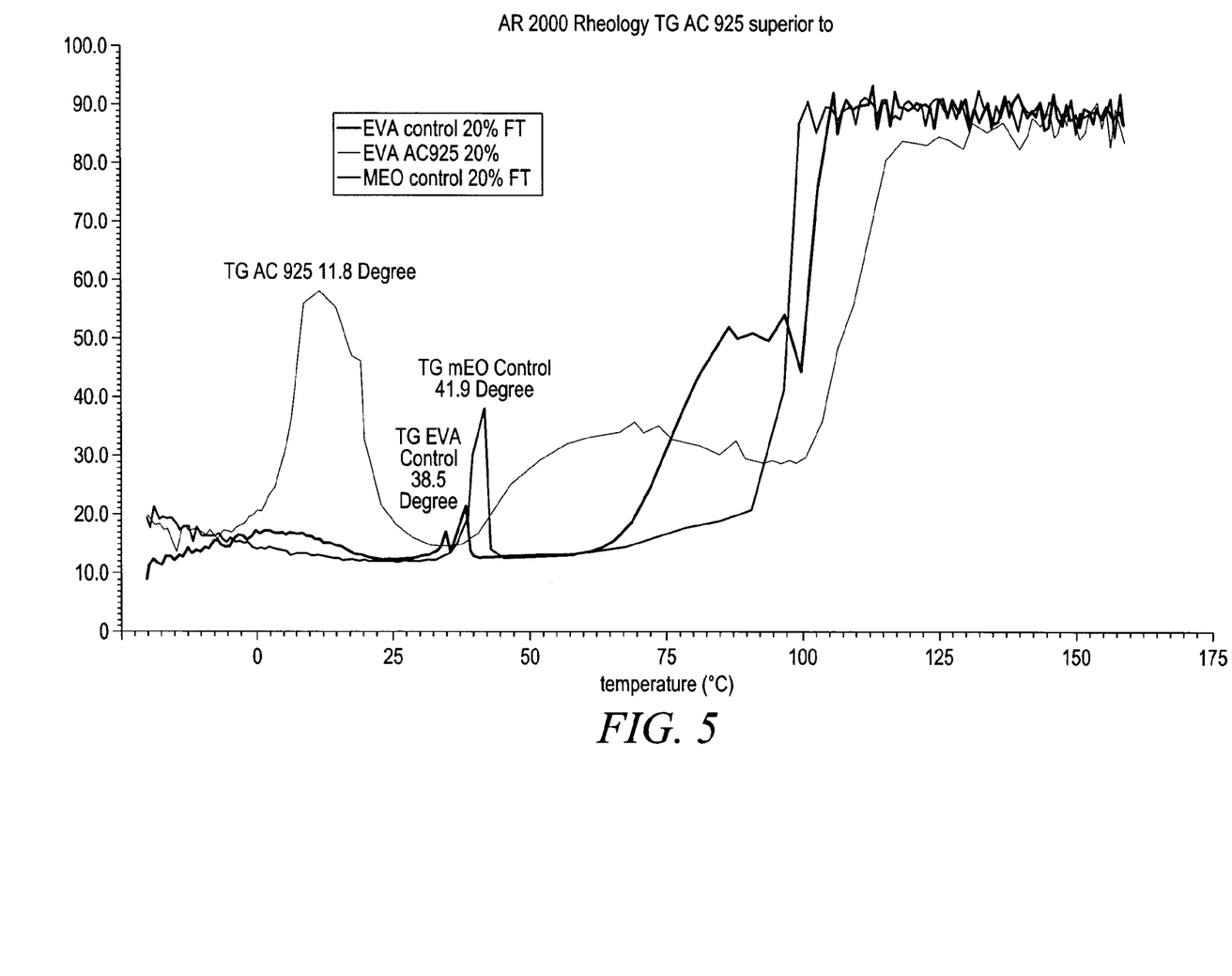
FIG. 5 provides graphic illustration of the raw data of Example 3, namely that the EVA containing compositions have better performance in cold temperature applications than the counterpart mEO.
Figure 6:
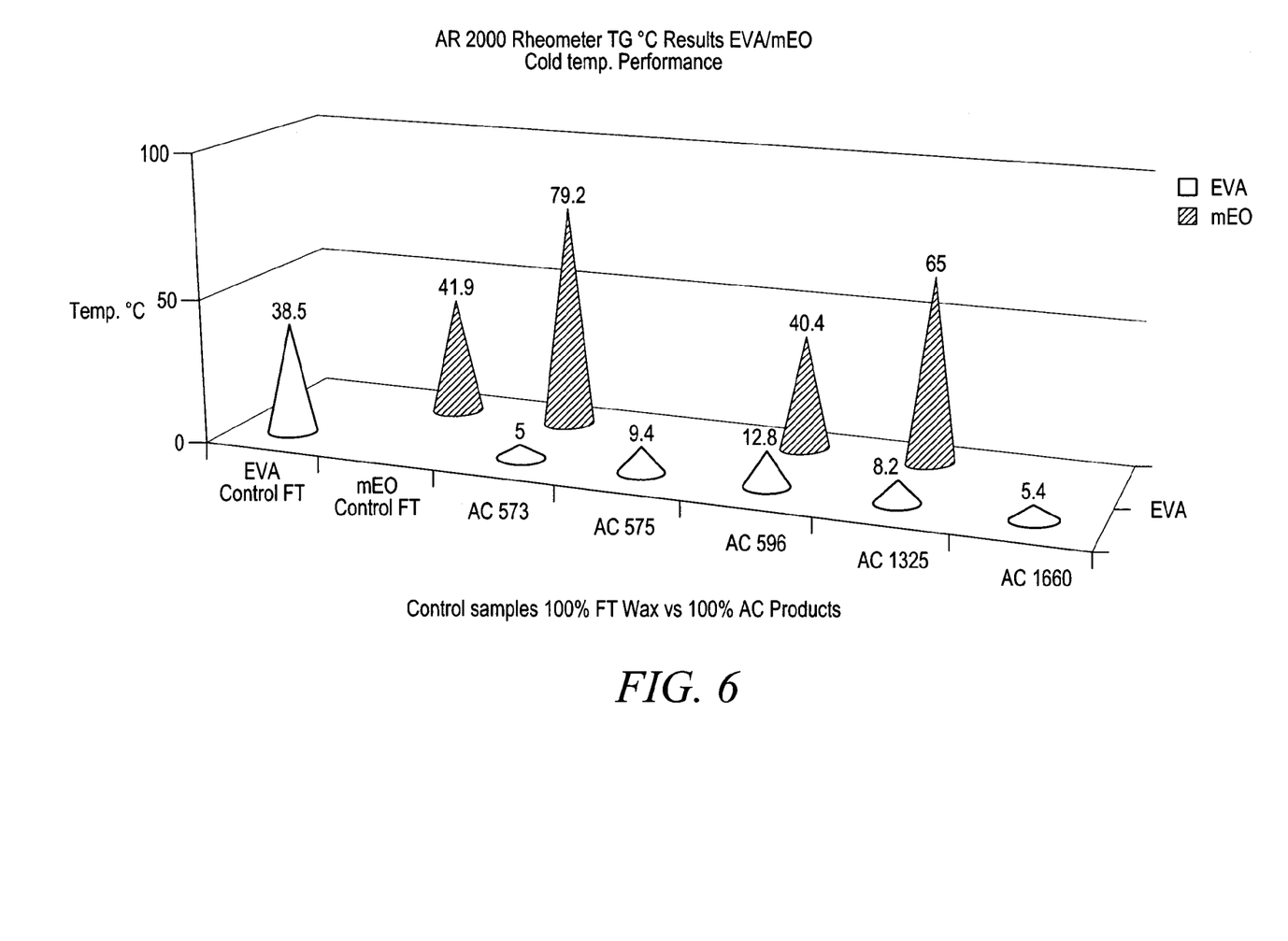
FIG. 6 provides a further graphic illustration of the raw data of Example 3 and in FIG. 5.

Example 3 provides a comparison of Tg results, which suggests improved flexibility of the test adhesives in cold temperature conditions, as compared to the controls. As illustrated by the figures, EVA containing compositions have better performance in cold temperature applications than the counterpart mEO. It also illustrates that replacing at least a portion of the FT wax in the mEO adhesive raises the Tg, but the adhesive is still better with the MAPPs added. The addition of MAPPs in place of FT in the EVA adhesive also lowers the Tg dramatically. This result is surprising and suggests that, with the inclusion of the MAPPs, the EVA adhesive is still flexible at lower temperatures, making it less brittle and providing better adhesion.

Finally, Example 4 provides fiber tear adhesion comparisons at 0° F. and 35° F. using 400 & 800 MFI EVA Resins based EVA adhesives and the compositions tested above. As illustrated, the Corrugated Bond at least at 0° F. and 35° F. support additional cold temperature adhesion when maleated additives were used with EVA base polymers.

The inventive hot melt adhesive compositions may further comprise other additives known in the art. Non-limiting embodiments include stabilizers, plasticizers, fillers, colorants, diluents such as oils, talcs such as silicate, minerals such as clays, or other additives deemed suitable by those skilled in the art, and combinations thereof. These may include functional additives which may add a specific physical or chemical property that impacts the characteristics of the adhesive in manufacturing or use, and not necessarily related to the adhesion character of the adhesive. In formulating adhesives, all of the ingredients should be compatible, so the formulation does not separate when heated or melted. Separation would result in the inability to apply the adhesive, as well as poor adhesive performance.

The hot melt adhesive compositions of the present invention are particularly useful in packaging applications and in the formation of packaging materials, such as food packaging materials. The hot melt adhesive compositions are also particularly useful in applications such as film laminating, woodworking profile wrapping, wood edge banding, and other adhesion applications with wood, steel, and wrapping films.

The invention further provides a process for forming the inventive hot melt adhesive compositions. The process comprises combining the above-described components of the inventive hot melt adhesive compositions, namely: a) a base polymer comprising ethylene vinyl acetate-containing polymer; b) a tackifier; c) an adhesion promoting additive comprising at least one semi-crystalline polymer having a weight average molecular weight of about 30,000 daltons or less; d) an optional wax; and e) and optional antioxidant.

The combining of these components may be done using any suitable conventional method such as mixing, extrusion, and the like. In one embodiment, the combining step comprises forming a substantially homogeneous admixture of components (a)-(e). In another embodiment, the combining comprises extruding components (a)-(e). Any conventional extrusion method may be used, such as melt extrusion, coextrusion, solid extrusion, master batching, melt blending, batch mixing, and the like. As used herein, when referring to components (a)-(e) the optional components (d) and (e) may or may not be included, as indicated above. To this end, a mixture of (a)-(e) may include components (a)-(c), (a)-(d), (a)-(c) and (e), or (a)-(e), or the like.

The invention further provides a process for forming an adhesive coated substrate. In this process, a hot melt adhesive composition is formed as described above. That is, components (a)-(e) are combined. The resulting hot melt adhesive composition is then heated to a temperature at or above the melting point of the overall hot melt adhesive composition. This heated hot melt adhesive composition is then applied to a substrate, using any suitable conventional technique, to thereby form an adhesive coated substrate. In certain embodiments, this process further comprises the subsequent step of bringing the hot melt adhesive composition to a temperature below the melting point of the composition, to at least partially solidify the hot melt adhesive composition. The substrate may comprise any suitable material which is adhereable to the hot melt adhesive and which it is desirable to adhere to another substrate. Particularly desirable substrates include those suitable in forming packaging materials for packaging applications, such as food packaging. Suitable substrate materials nonexclusively include plastic films and sheets, metal sheets, lacquer coated papers, polypropylene, wood, paper, cellulosics, corrugated, cardboard, coated board, coated carton stock, composites, aluminum, glass, steel and rebar and the like. In one preferred embodiment, the substrate comprises a polyolefin film. In another preferred embodiment, the substrate comprises a metal sheet.

In a further process, the formed adhesive substrate is contacted with an article, such that the article adheres to the adhesive substrate via the hot melt adhesive composition. In certain embodiments, this process further comprises the subsequent step of bringing the hot melt adhesive composition to a temperature below the melting point of the composition. As stated above, this preferably at least partially solidifies the hot melt adhesive composition. The article may comprise any suitable material which is capable of adhering to the adhesive coated substrate. Particularly desirable articles include those suitable for use in forming packaging materials for packaging applications, such food packaging. The article may or may not comprise substantially the same material as that used for the aforementioned adhesive substrate. Suitable article materials nonexclusively include plastic films and sheets, metal sheets, paper, corrugated board, wood, coated carton stock and the like. In one preferred embodiment, the substrate comprises a polyolefin film. In another preferred embodiment, the substrate comprises a vinyl film. In another preferred embodiment, the substrate comprises a metal sheet.

In accordance with the present invention, it is preferred that the article which adheres to the adhesive substrate via the hot melt adhesive composition maintains adhesion to the adhesive substrate at elevated temperatures and/or at refrigerator and/or freezer temperatures, as described above. In one preferred embodiment, the article maintains adhesion to the adhesive substrate at temperatures of about 60° C. or above. In another preferred embodiment, the article maintains adhesion to the adhesive substrate at refrigerator or freezer temperatures, such as temperatures of about 5° C. or below. The Examples below show specific data relating to adhesion properties of the inventive hot melt adhesive compositions.

The following non-limiting examples serve to illustrate the invention. It will be appreciated that variations in proportions and alternatives in elements of the components of the invention will be apparent to those skilled in the art and are within the scope of the present invention.

Example 1

An EVA hot melt adhesive composition was formed with the formulations provided in Table A, below.

TABLE A

| | Cont. 1 | Cont. 2 | AC 573 | AC 573a | AC 1325 | AC 1325a | AC 1325b | AC 596 | AC 596a | AC 596b | AC 925 | AC 925a |
|---|---|---|---|---|---|---|---|---|---|---|---|---|
| Sasol H-1 | 20 | 20 | | | | | | | | | | |
| EVA | 40 | 40 | 40 | 40 | 40 | 40 | 40 | 40 | 40 | 40 | 40 | 40 |
| Sylvalite RE-100L | 40 | 39.8 | 40 | 39.6 | 40 | 39.8 | 39.6 | 40 | 39.8 | 39.6 | 40 | 39.8 |
| Antioxidant | | 0.2 | | 0.4 | | 0.2 | 0.4 | | 0.2 | 0.4 | | 0.2 |
| AC573 | | | 20 | 20 | | | | | | | | |
| AC1325 | | | | | 20 | 20 | 20 | | | | | |
| AC596 | | | | | | | | 20 | 20 | 20 | | |
| AC925 | | | | | | | | | | | 20 | 20 |

The shear adhesion failure temperature (SAFT) and peel adhesion failure temperature (PAFT) was then tested using PAFT & SAFT heat resistance test procedures set forth in ASTM D4498, the contents of which are incorporated herein by reference. For SAFT, a one inch by one inch lap shear bond to case cartons, using the indicated hot melt adhesive in its molten state, was prepared. Samples were hung vertically in an air circulating oven at 30° C. with a weight suspended from the bottom of the strip. The oven temperature was increased by 30° C. every 60 minutes until the adhesive bond failed.

For PAFT, a one inch by one inch lap shear bond to case cartons, using the indicated hot melt adhesive in its molten state, was prepared. The samples were hung with 100 g weights. Square inch samples were placed against an 88° angled metal cross beam in an air circulating oven at 30° C. The oven temperature was increased by 30° C. every 60 minutes until the adhesive bond failed.

Table B provides the results of these tests, which are also depicted in graphic form in FIGS. 1 and 2.

TABLE B

|  | Cont. 1 | Cont. 2 | AC 573 | AC 573a | AC 1325 | AC 1325a | AC 1325b | AC 596 | AC 596a | AC 596b | AC 925 | AC 925a |
|---|---|---|---|---|---|---|---|---|---|---|---|---|
| PAFT-avg | 134 | 135.15 | 121 | 133.9 | 120 | 138.05 | 146.75 | 122 | 129.95 | 151.15 | 124 | 146.8 |
| SAFT-avg | 193 | 210.9 | 150 | 272.1 | 152 | 181.1 | 296.5 | 151 | 175.4 | 304.5 | 155 | 185.25 |

The results shown above demonstrate improved physical properties as a result of adding an adhesion promoting agent and an anti-oxidant. Without being bound by theory, it is believed that maleated products, particularly in high temperature application for Hot Melt Adhesives, sometimes form cross linked gels, which may reduce physical attributes of the adhesive. Adding an adhesion promoting additive and anti-oxidant improves the SAFT & PAFT numbers.

Example 2

An EVA hot melt adhesive composition was formed with the formulations provided in Table C, below.

TABLE C

|  | EVA Control | EVA Control | mEO Control | AC 1325 | AC 596 | AC925/ 907 |
|---|---|---|---|---|---|---|
| Sasol H-1 | 20 | 20 | 30 |  |  |  |
| EVA | 40 | 40 |  | 40 | 40 | 40 |
| mEO |  |  | 40 |  |  |  |
| Sylvalite RE-100L | 40 | 39.8 | 30 | 39.8 | 39.8 | 39.8 |
| Antioxidant |  | 0.2 | 0.2 | 0.2 | 0.2 | 0.2 |
| AC596 |  |  |  |  | 20 |  |
| AC925/907* |  |  |  |  |  | 20 |
| AC1325 |  |  |  | 20 |  |  |

*AC 925 and AC 907 refer to different trade names for the same component. They are used interchangeably in this analysis.

A stainless steel lap shear test was then performed using lap shear test protocols set forth in ASTM D1002, the contents of which are incorporated herein by reference in its entirety. The results of this test are shown below in FIGS. 3 and 4

Figure 3:
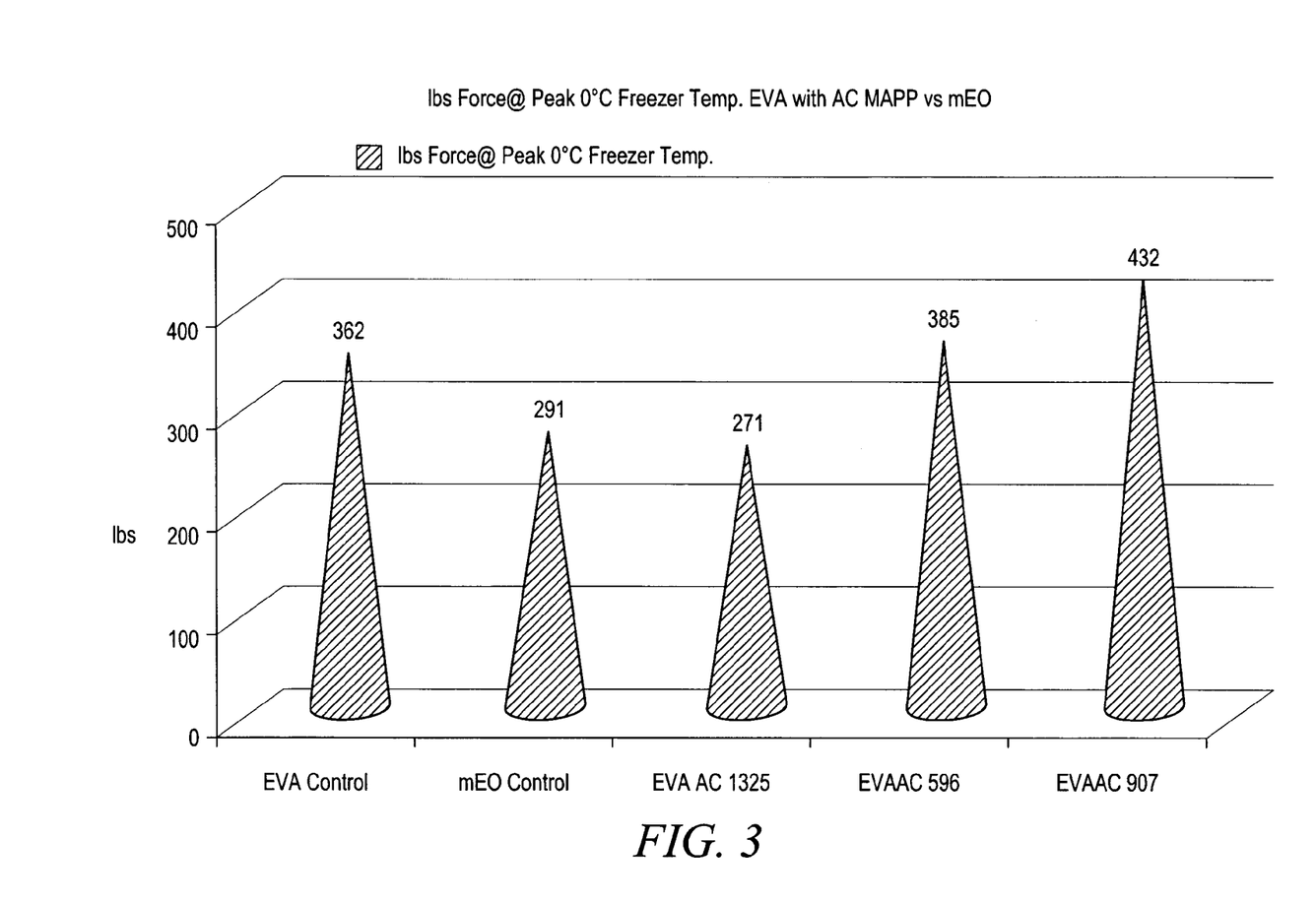
FIG. 3 provides a graphic illustration of adhesive strength at 0° C. (freezer temperature) of the compositions tested in Example 2.

FIG. 3 demonstrates raw data of adhesive strength at 0° C. (freezer temperature). As indicated, the EVA control and several EVA/MAPP blends outperformed the standard mEO affinity for cold packaging adhesives. Moreover, the performance of the adhesive is correlated with the percent maleation. AC 1325, AC 596 and AC 907 have a SAP number of about 18, 50 and 87, respectively. The higher the SAP number, i.e. the higher the percent maleation, the more moieties available for adhesion. As illustrated by the graph, the higher the SAP number, the better the adhesive. While it is noted that EVA AC 1325 had an adhesive performance that was less than the control, it is believed that this performance would be boosted with increased antioxidant levels, as established in Example 1. To this end, a combination of increased maleation and antioxidant resulted in improvement properties in the lap shear testing.

Figure 4A:
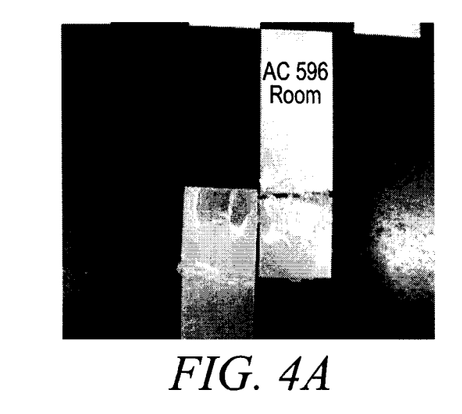
FIGS. 4A-D illustrate, pictorially, metal coupons after the lap shear testing of Example 2.
Figure 4B:
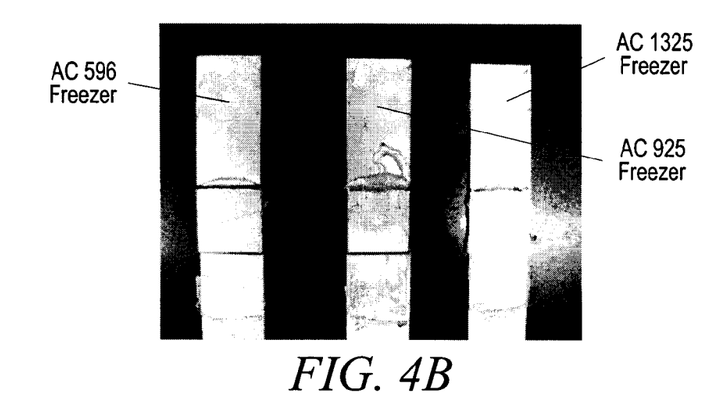
Figure 4C:
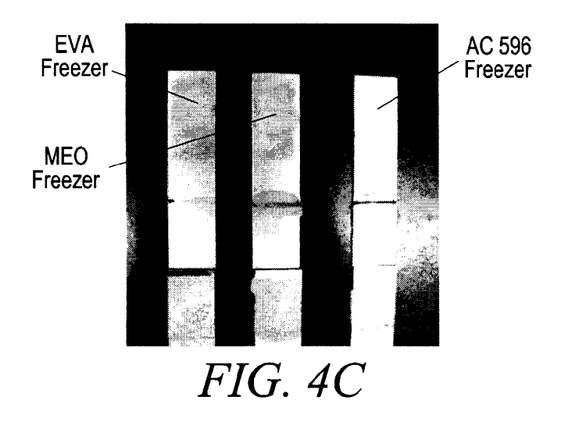
Figure 4D:
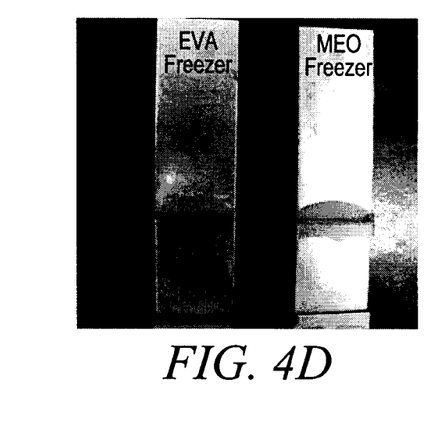

FIGS. 4A-D illustrate, pictorially, metal coupons after lap shear testing. FIG. 4A illustrates cohesive failure of EVA/AC596 (replacing FT-H105 component at 20% of Adhesive blend) at room temperature. FIG. 4B illustrates EVA/AC596, AC925, AC1325 cohesive failure at 0° C. (replacing FT-H105 component at 20% of adhesive blend). FIG. 4C illustrates adhesive failure for control formulations of EVA and mEO, compared with AC 596 (with FT-H105 component at 20% of adhesive blend). It shows cohesive failure at 0° C. FIG. 4D illustrates with a close up control sample formulations EVA and mEO at 0° C. adhesive failure.

Example 3

This example followed standard procedures for an AR 2000 Rheology TG testing using the hot melt adhesive compositions of Table D, below. That is, an oscillation procedure was conducted between 25 mm parallel plates. The gap was set at 1000 mm. A strain rate of 1% was used and a frequency of 1 Hz was applied to the test sample. Each sample was taken through a temperature ramp, which started at 140° C. and decreased at a rate of 3° C./minute to −25° C. The Tan delta curve peak was taken as Tg (glass transition temperature) and resulted in the graphic illustration of FIGS. 5 and 6.

TABLE D

|  | EVA Control | mEO Control | AC 573 | AC 573a | AC 575 | AC 575a | AC 1660 | AC 1660a | AC 1325 | AC 1325a | AC 596 | AC 596a |
|---|---|---|---|---|---|---|---|---|---|---|---|---|
| Sasol H-1 | 20 | 20 |  |  |  |  |  |  |  |  |  |  |
| EVA | 40 |  | 40 |  | 40 |  | 40 |  | 40 |  | 40 |  |
| mEO |  | 40 |  | 40 |  | 40 |  | 40 |  | 40 |  | 40 |
| Sylvalite RE-100L | 40 | 40 | 40 | 39.8 | 40 | 39.8 | 40 | 39.8 | 40 | 39.8 | 40 | 39.8 |
| Antioxidant |  |  |  | 0.2 |  | 0.2 |  | 0.2 |  | 0.2 |  | 0.2 |
| AC573 |  |  | 20 | 20 |  |  |  |  |  |  |  |  |
| AC575 |  |  |  |  | 20 | 20 |  |  |  |  |  |  |
| AC1325 |  |  |  |  |  |  |  |  | 20 | 20 |  |  |
| AC596 |  |  |  |  |  |  |  |  |  |  | 20 | 20 |
| AC1660 |  |  |  |  |  |  | 20 | 20 |  |  |  |  |

FIG. 6 provides a conical illustration of the raw data in FIG. 5. FIGS. 5 and 6 illustrate that the EVA containing compositions have better performance in cold temperature applications than the counterpart mEO. It also illustrates that replacing at least a portion of the FT wax in the mEO adhesive raises the Tg, but the adhesive is still better when the MAPPs were added. The addition of MAPPs in place of FT in the EVA adhesive also lowers the Tg dramatically. This result is surprising and suggests that, with the inclusion of the MAPPs, the EVA adhesive is still flexible at a lower temperatures, making it less brittle and providing better adhesion.

Example 4

Fiber tear adhesion at 0 and 35° F. was also run on both 400 & 800 MFI EVA Resin based EVA adhesives based on the compositions provided in the following Tables E & F. More specifically, adhesive bonds were evaluated by laminating two 1"×3" pieces of 56# high performance corrugated board stock from Inland Container Company. The lamination was prepared by applying a round bead of 0.2=/−0.05 grams of adhesive at 177° C., longitudinally down the center for the full length of one piece of corrugated board. The second piece of corrugated board was placed on top of the adhesive coated first piece within three seconds, and a 200 g weight was placed on top to compress the bond until the adhesive set. The bonds were conditioned at the test temperature for 24 hours. The bonds were then torn by hand and the percent fiber tear was recorded.

As illustrated in each of these Tables, the Corrugated Bond at least at 0° F. and 35° F., supported additional Cold Temperature adhesion, when maleated additives were used with EVA base polymers.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An adhesive composition which comprises:
    a) a base polymer comprising an ethylene vinyl acetate-containing polymer;
    b) a tackifier;
    c) an adhesion promoting additive comprising at least one semi-crystalline polymer having a weight average molecular weight of about 30,000 daltons or less;
    d) an antioxidant; and
    e) an optional wax.

2. The composition of claim 1 wherein the adhesion promoting additive comprises at least one propylene con-

TABLE E

|  | EVA Control | EVA Control 2 | AC 573 | AC 573a | AC 575 | AC 1325 | AC 1325a | AC 596 | AC 596a | AC 596b | AC 925 | AC 925a |
|---|---|---|---|---|---|---|---|---|---|---|---|---|
| Sasol H-1 | 20 | 20 |  |  |  |  |  |  |  |  |  |  |
| EVA 400 MFI | 40 | 40 | 40 | 40 | 40 | 40 | 40 | 40 | 40 | 40 | 40 | 40 |
| Sylvalite RE-100L | 40 | 39.8 | 40 | 39.6 | 39.6 | 39.8 | 39.6 | 40 | 39.8 | 39.6 | 40 | 39.8 |
| Antioxidant |  | 0.2 |  | 0.4 | 0.4 | 0.2 | 0.4 |  | 0.2 | 0.4 |  | 0.2 |
| AC573 |  |  | 20 | 20 |  |  |  |  |  |  |  |  |
| AC575 |  |  |  |  | 20 |  |  |  |  |  |  |  |
| AC1325 |  |  |  |  |  | 20 | 20 |  |  |  |  |  |
| AC596 |  |  |  |  |  |  |  | 20 | 20 | 20 |  |  |
| AC925 |  |  |  |  |  |  |  |  |  |  | 20 | 20 |
| Corrugated Bonds |  |  |  |  |  |  |  |  |  |  |  |  |
| % Fiber tear at 0° F. | 0 |  | 75 |  |  | 75 |  | 0 |  |  | 75 |  |
| % Fiber tear at 35° F. | 100 |  | 100 |  |  | 100 |  | 100 |  |  | 100 |  |
| Carton Bonds |  |  |  |  |  |  |  |  |  |  |  |  |
| % Fiber Tear 35° F. | 100 |  | 100 |  |  | 100 |  | 100 |  |  | 100 |  |

TABLE F

|  | EVA Control | AC 573 | AC 575 | AC 1325 | AC 596 | AC 925 | AC 573 | AC 1325 | AC 596 | AC 925 |
|---|---|---|---|---|---|---|---|---|---|---|
| Sasol H-1 | 20 | 15 | 15 | 15 | 15 | 15 |  |  |  |  |
| EVA 800 MFI | 40 | 40 | 40 | 40 | 40 | 40 | 40 | 40 | 40 | 40 |
| Sylvalite RE-100L | 40 | 40 | 40 | 40 | 40 | 40 | 40 | 40 | 40 | 40 |
| Antioxidant |  |  |  |  |  |  |  |  |  |  |
| AC573 |  | 5 |  |  |  |  | 20 |  |  |  |
| AC575 |  |  | 5 |  |  |  |  |  |  |  |
| AC1325 |  |  |  | 5 |  |  |  | 20 |  |  |
| AC596 |  |  |  |  | 5 |  |  |  | 20 |  |
| AC925 |  |  |  |  |  | 5 |  |  |  | 20 |
| Corrugated Bonds |  |  |  |  |  |  |  |  |  |  |
| % Fiber tear at 0° F. | 0 | 0 | 0 | 50 | 0 | 0 | 0 | 75 | 0 | 0 |
| % Fiber tear at 35° F. | 50 | 0 | 0 | 100 | 25 | 100 | 100 | 100 | 100 | 100 |
| Carton Bonds |  |  |  |  |  |  |  |  |  |  |
| % Fiber Tear 35° F. | 100 | 100 | 100 | 100 | 100 | 100 | 100 | 100 | 100 | 100 | taining polymer, maleated propylene containing polymer, maleated ethylene containing polymer, or combinations thereof.

3. The composition of claim 1 wherein the adhesion promoting additive comprises a maleated polymer having a SAP number of equal to or greater than 20.

4. The composition of claim 1 wherein the adhesion promoting additive comprises a maleated polymer having a SAP number of equal to or greater than 50.

5. The composition of claim 1 wherein the adhesion promoting additive is present in an amount of from about 1 percent to about 30 percent by weight of the adhesive composition.

6. The composition of claim 1 wherein the base polymer has a melt index of from about 5 to about 3000.

7. The composition of claim 1 wherein the ethylene vinyl acetate-containing polymer is present in the adhesive compound in an amount ranging from about 30 wt. % to about 60 wt. %, based on the total weight of the adhesive.

8. The composition of claim 1 wherein the ethylene vinyl acetate-containing polymer comprises between about 15 wt. % and about 85 wt. % of ethylene monomer.

9. The composition of claim 1 wherein the antioxidant comprises at least one antioxidant selected from the group consisting of sterically hindered phenols, multifunctional phenols, sulfur-contained phenols, phosphorous-containing phenols, and combinations thereof.

10. The composition of claim 1 wherein the antioxidant is present in an amount greater than or equal to 0.2 wt. %, based on the weight of the adhesive.

11. A process for forming an adhesive substrate which comprises:
   I) forming an adhesive composition by combining:
      a) a base polymer comprising an ethylene vinyl acetate-containing polymer;
      b) a tackifier;
      c) an adhesion promoting additive comprising at least one semi-crystalline polymer having a weight average molecular weight of about 30,000 daltons or less;
      d) an antioxidant; and
      e) an optional wax;
   II) heating the adhesive composition to a temperature at or above the melting point of the adhesive composition; and
   III) applying the heated adhesive composition to a substrate.

12. The process of claim 11 which further comprises the subsequent step (V) of bringing the adhesive composition to a temperature below the melting point of the composition.

13. A packaging material which comprises the adhesive composition of claim 1.

14. A adhesive composition which comprises:
   a) a base polymer comprising an ethylene vinyl acetate-containing polymer;
   b) a tackifier;
   c) an adhesion promoting additive comprising at least one semi-crystalline polymer having a weight average molecular weight of about 30,000 daltons or less wherein the adhesion promoting additive comprises a maleated polymer having SAP number equal to or greater than 20;
   d) an antioxidant; and
   e) an optional wax.

15. The composition of claim 14 wherein the adhesion promoting additive comprises at least one propylene containing polymer, maleated propylene containing polymer, maleated ethylene containing polymer, or combinations thereof.

16. The composition of claim 14 wherein the adhesion promoting additive is present in an amount of from about 1 percent to about 30 percent by weight of the adhesive composition.

17. The composition of claim 14 wherein the base polymer has a melt index of from about 5 to about 3000.

18. The composition of claim 14 wherein the ethylene vinyl acetate-containing polymer is present in the adhesive compound in an amount ranging from about 30 wt. % to about 60 wt. %, based on the total weight of the adhesive.

19. The composition of claim 14 wherein the ethylene vinyl acetate-containing polymer comprises between about 15 wt. % and about 85 wt. % of ethylene monomer.

20. The composition of claim 14 wherein the antioxidant comprises at least one antioxidant selected from the group consisting of sterically hindered phenols, multifunctional phenols, sulfur-contained phenols, phosphorous-containing phenols, and combinations thereof.

21. The composition of claim 18 wherein the antioxidant is present in an amount equal to or greater than 0.2 wt. %, based on the weight of the adhesive.

22. The composition of claim 14 wherein the wax comprises the substantial absence of a Fischer-Tropsch wax.

23. A packaging material which comprises the adhesive composition of claim 14.

* * * * *